(12) United States Patent
Wang

(10) Patent No.: US 7,771,501 B2
(45) Date of Patent: Aug. 10, 2010

(54) BLOWER HAVING OIL-MIST FILTERING FUNCTION

(76) Inventor: Ming-Chih Wang, No. 13, Lane 678, Feng Nan St., Feng Yuen, Taichung Hsien (TW)

(*) Notice: Subject to any disclaimer, the term of this patent is extended or adjusted under 35 U.S.C. 154(b) by 393 days.

(21) Appl. No.: 11/875,968

(22) Filed: Oct. 22, 2007

(65) Prior Publication Data

US 2009/0101558 A1    Apr. 23, 2009

(51) Int. Cl.
*B01D 51/00*    (2006.01)
(52) U.S. Cl. .............. 55/467; 55/DIG. 18; 55/DIG. 30; 55/337; 55/428; 55/482; 55/484; 55/481; 55/478
(58) Field of Classification Search ............... 55/467, 55/DIG. 18, DIG. 30, 337, 428, 482, 484, 55/481, 478
See application file for complete search history.

(56) References Cited

U.S. PATENT DOCUMENTS

| 4,167,798 | A | * | 9/1979 | Klugl et al. | .................... 15/320 |
| 4,361,425 | A | * | 11/1982 | Hata | ........................... 96/140 |
| 4,963,329 | A | * | 10/1990 | Burgess et al. | .............. 422/168 |
| 6,214,071 | B1 | * | 4/2001 | Wang | ........................... 55/337 |

* cited by examiner

Primary Examiner—Jason M Greene
Assistant Examiner—Dung Bui
(74) Attorney, Agent, or Firm—Leong C. Lei

(57) ABSTRACT

A blower having oil-mist blower is disclosed. The blower is provided with tubing fitting on the wind suction opening connecting in series to an oil-collection box module. The position of the venting tube of the blower is connected to cyclone-separator. The oil-collection box module includes a box body, oil-collection seat body, filter and a cover plate. The cyclone-separator includes manifold tubing, filtering aid and a top cover. When the blower is in operation, the oil-collection box module sucks in oil-mist exhaust gas to proceed with first filtering of oil spot after that via the venting tubing into the cyclone-separator to proceed with a second filtering of oil spot.

3 Claims, 10 Drawing Sheets

BLOWER HAVING OIL-MIST FILTERING FUNCTION

BACKGROUND OF THE INVENTION (a) Technical Field of the Invention

The present invention relates to blower, and in particular, to a blower having a sucking end connected in series an oil-collection box module.

(b) Description of the Prior Art

FIG. 1 is a conventional blower structure having a housing 23 extended to a hollow tubing section 231, and the wall of the tubing section has a long slot 232 for the mounting of fibrous filtering aid 27 at the cavity. One lateral side of the long slot 232 is a pivoting cover 234 adhered with a sealing pad 233 and the corresponding end of the long slot 232 is a locking rim 235 for hooking to the pivoting cover 234. The housing 23 at a proximity to the blade 222, is locked with a metallic net 261, a sealing rim 262 and a ring 26. Further, the blower structure has a casing 21 provided with passages 212 and an opening 213 which is coupled to a connector 215 via a tubular member 214. The connector 215 is connected with a pipe 216. The opening 213 is provided with a port 211. The housing 23 has a port 236 and a connector 237. A pipe connector 25 having a port 251 is engaged with the port 236 of the housing 23.

SUMMARY OF THE INVENTION

The primary purpose of the present invention is to provide an oil-mist filtering blower having tube fitting with air suction port connected in series with an oil collection box module and connected a cyclone separator at a position mounting a discharging tube, characterized in that the oil collection box module comprises a box body, oil collection seat body, filter and covering plate, a connection tube of the covering plate is inserted onto the fittings of the blower and a screw bolt is used for locking; the box body is a hollow shell body having an opening facing the top and the bottom face of the box body is protruded out with a plurality of vertical pillars for locking the oil collection seat body, on the other lateral side of the box body is provided with a large connection tube with an air suction port, a small connector having a streaming hole is locked at a proximal position to the bottom section of the box body, on the other lateral side of the box body, a notch is provided which is used for placing or retrieving the filter, a hinge and a hook pivot is used for mounting an actuating door, the shutting down of the actuating door seals the notch and the inner lateral face of the actuating door is provided with a sealing ring; the downward face of the oil collection seat body is depressed with a conic section having streaming holes, the top face of the oil collection seat body is used to hold the filter such that the filter is exactly positioned at the abdomen region of the box body, the cyclone separator comprises a manifold tube, filtering material and a top cover and the side tube of the manifold tube is connected to the air discharging tube of the blower; and the manifold tube is integrally formed as one unit comprising a bottom tube, top tube, and a side tube; and the lower section of the bottom tube is provided with a conic section for fastening a streaming connector, the wall of the top tube is provided with a lateral opening and a hinge and a hook are used to pivotally mount an actuating door, when the door is closed, the side opening is exactly sealed, and the top tube is for holding the filtering material and the lateral opening is used for placing or withdrawing the filtering material; and the top cover is locked at the top section of the manifold body, and the top face of the top cover is protruded out with a connection tube having an air discharging port and the bottom face thereof is mounted with a filter; in operation, oil-mist is rapidly sucked from the suction hole of the connection tube, and then via the wall of the filter to proceed with first time filtering of oil residue and then through the air discharging tube, after that from the lateral tube into the manifold tube, and through the filtering material for a second oil residue filtering such that clean air is discharged via the air discharging port at the top cover, and the oil mist as a result of the atmospheric turbulence is condensed at the internal wall of the manifold tube, forming into oil residue and flowing downward to the steaming connector for recycling, and the gathered oil residue at the box body is directed from the connector for recycling, thus, a secondary filtering is effected.

Still another object of the present invention is to provide an oil-mist filtering blower, wherein the bottom face of the box body is provided with a large air suction port and the bottom face is positioned with a shock reducing pad with porous pore and a connection tube, and the connection tube is connected in series to the bottom section of the air suction port of the box body and the tube end of the bottom section of the connection tube is mounted with a protection net.

A further object of the present invention is to provide an oil-mist filtering blower, wherein the bottom section of the connection tube employs an extension connection to connect to a bending tube having mounted with another protection net at the end of the bending tube, the extension tube and the bending tube extend into the interior of a fabrication machine to suck oil mist.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
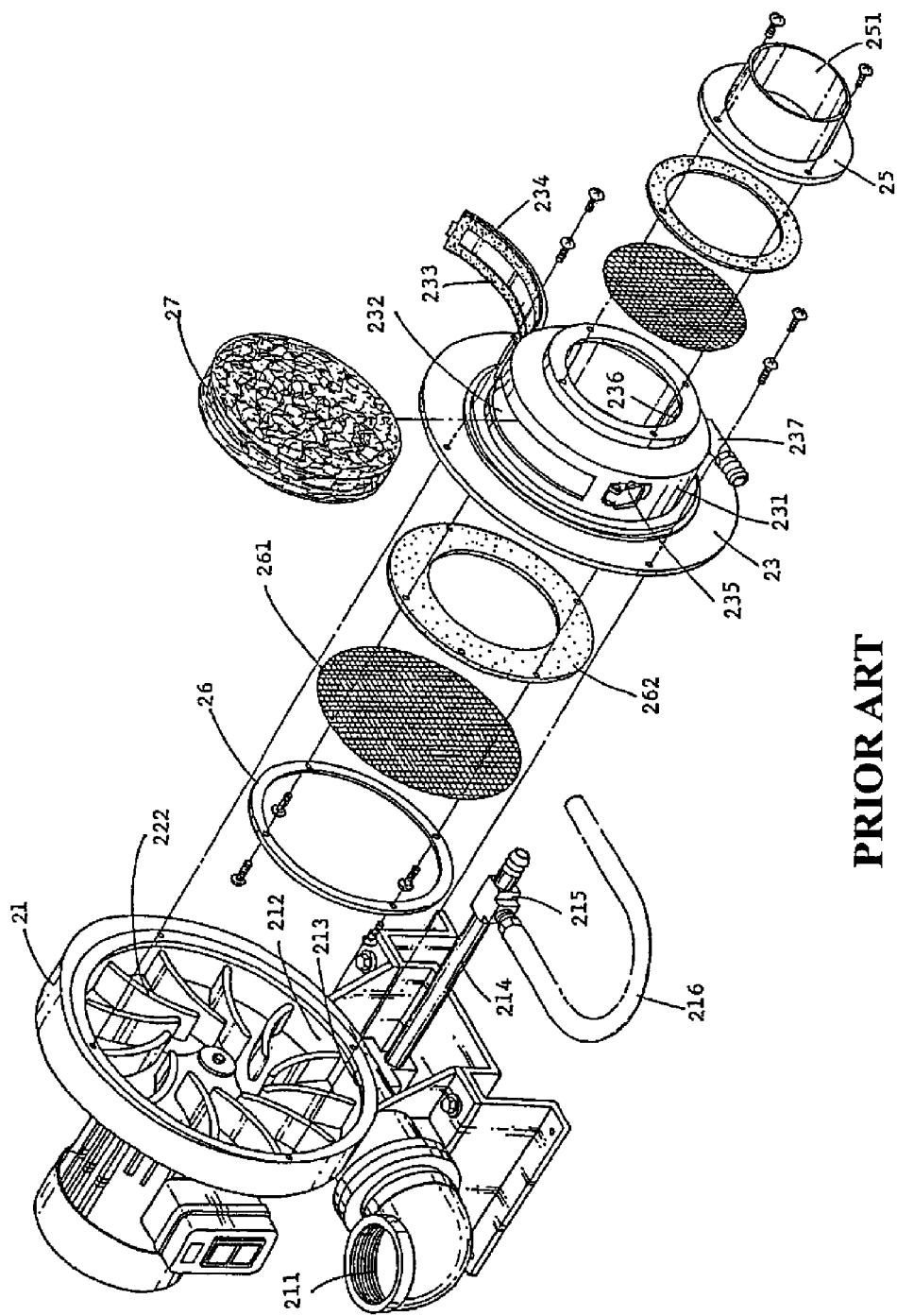
FIG. 1 is a perspective exploded view of a conventional blower.
Figure 2:
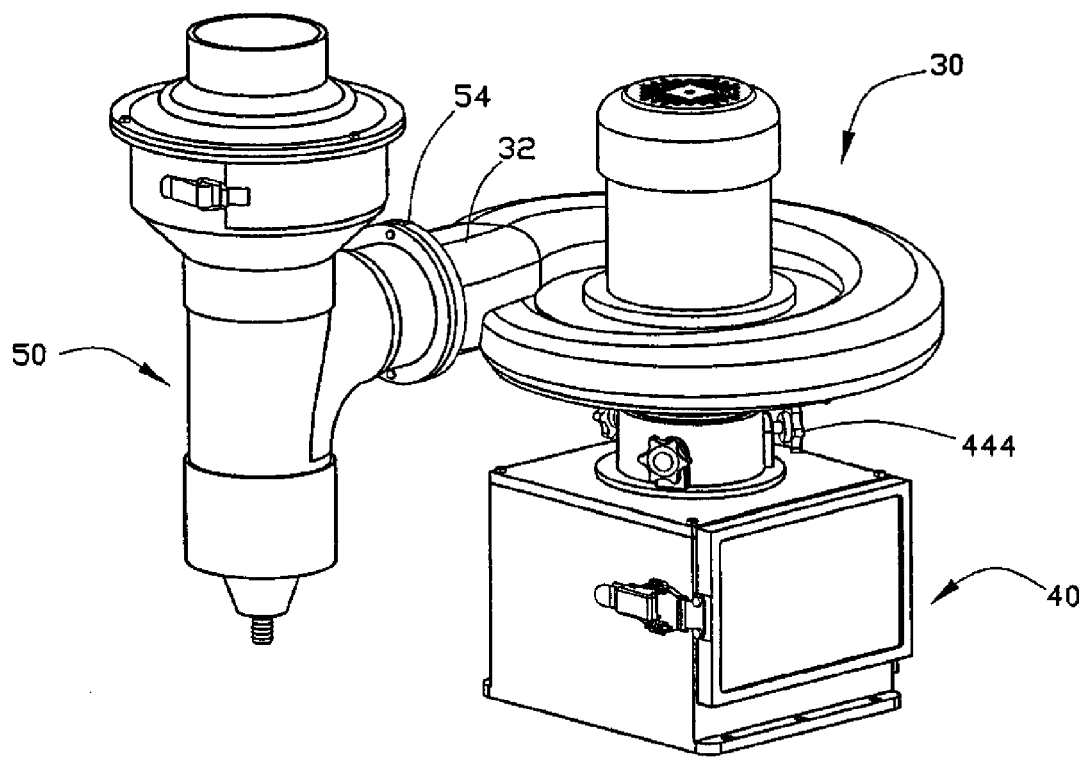
FIG. 2 is a perspective view of a blower in accordance with the present invention.
Figure 3:
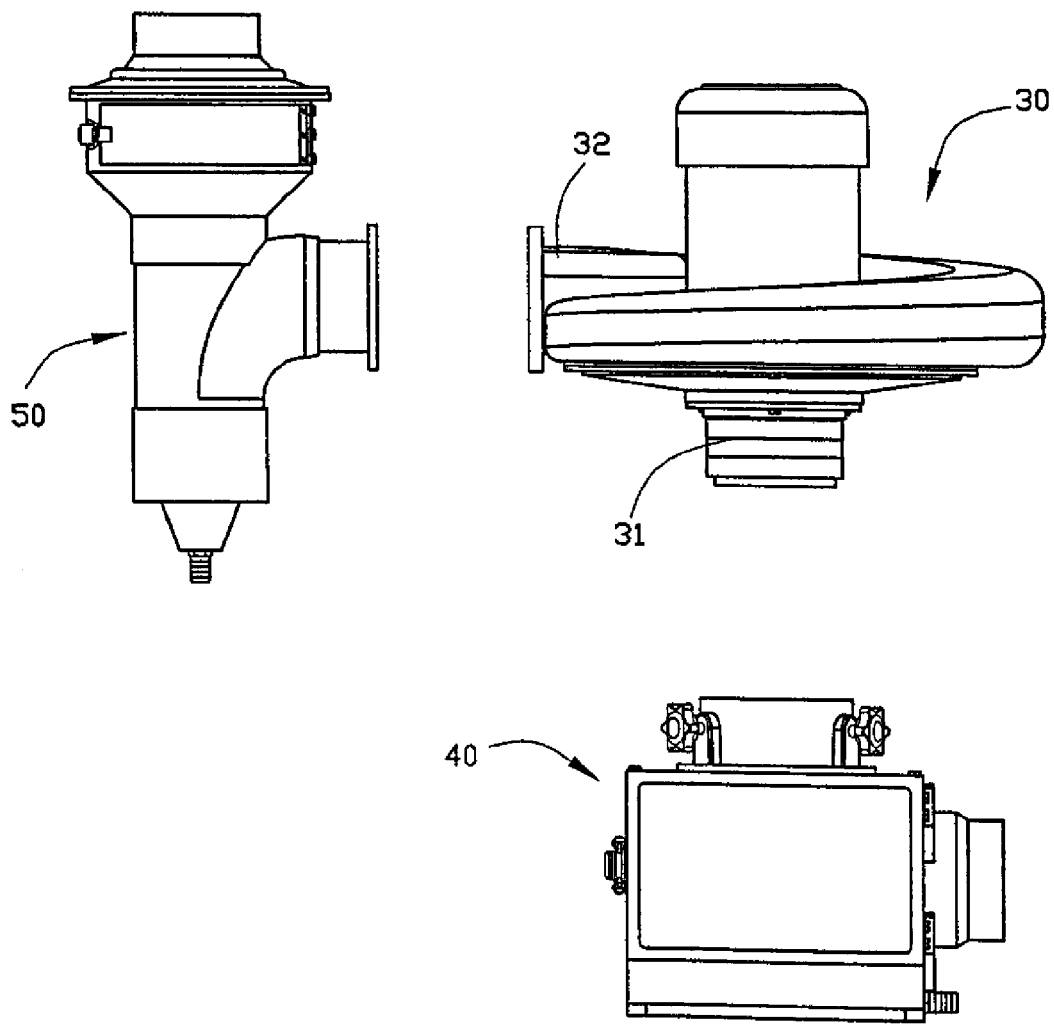
FIG. 3 are schematic views showing the blower of the present invention.
Figure 4:
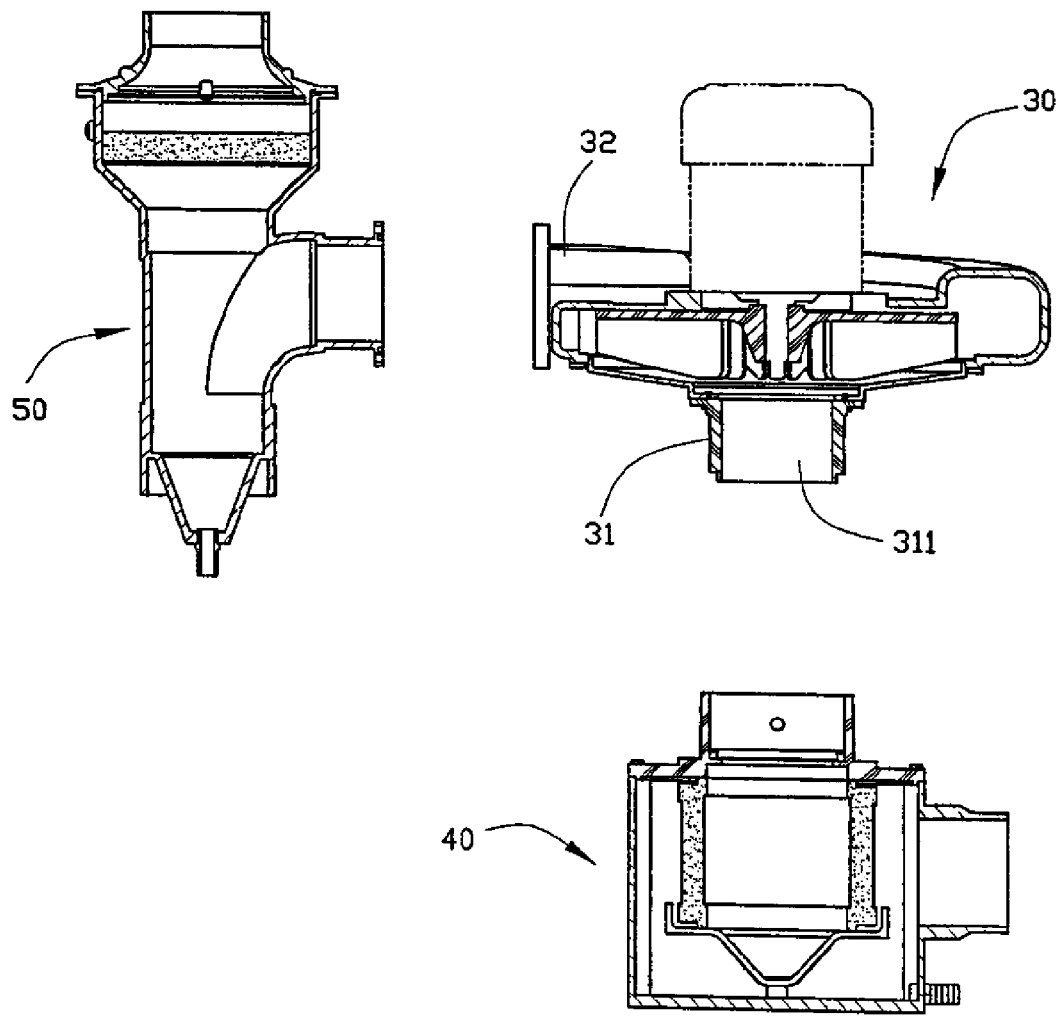
FIG. 4 are sectional views showing the blower of the present invention.

Referring to FIGS. 2 to 4, there is shown an oil mist filtering blower 30 having a tube fitting 31 with air suction port 311 and is connected in series to an oil collection box module 40. The position of an air discharging tube 32 is mounted with a cyclone separator 50. When the blower 30 is in operation, oil mist residue is sucked from the oil collection box module 40 for a preliminary filtering, and after the filtering, the oil mist residue enters the blower 30 and passes through the air discharging tube 32 into the cyclone separator 50 for another filtering of oil residue.

Figure 5:
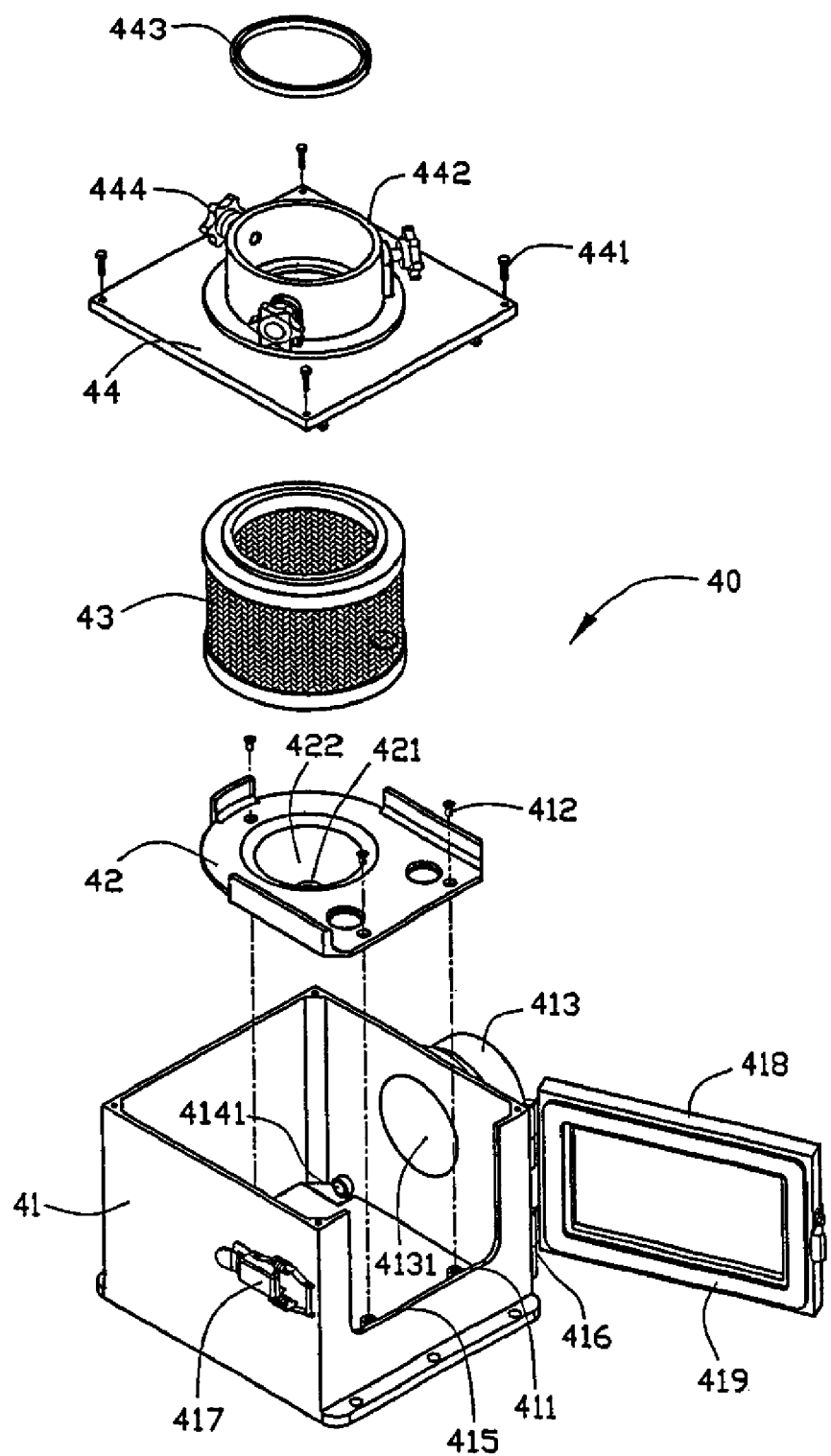
FIG. 5 is a perspective exploded view of the blower of the present invention.

As shown in FIGS. 5 and 2, the oil collection box module 40 comprises a box body 41, oil collection seat body 42, a filter 43 and a covering plate 44.

The box body 41 is a hollow shell body having an opening facing the top and the bottom face of the box body is protruded out with a plurality of vertical pillars 411 for locking the oil collection seat body 42 using screw 412, and a lateral side of the box body 41 is provided with a large connection tube 413 with an air suction port 4131. A small connector 414 having a streaming hole 4141 is locked at a proximal position to the bottom section of the box body 41. On the other lateral side of the box body 41, a notch 415 is provided which is used for placing or retrieving the filter 43, a hinge 416 and a hook pivot 417 are used for mounting an actuating door 418 such that the closing of the actuating door 418 seals the notch 415 and the inner lateral face of the actuating door 418 is provided with a sealing ring 419.

In the present invention, the downward face of the oil collection seat body 42 is depressed with a conic section 422 having a streaming hole 421, and the top face of the oil collection seat body 42 is used to hold the filter 43 such that the filter 43 is exactly positioned at the abdomen region of the box body 41.

The cover plate 44 is mounted to the top section of the box body 41 using screws 441, and the top section is protruded to form a connection tube 422 having mounted with sealing ring 443.

The oil collection box module 40 is connected to the tube fitting 31 of the blower 30 by the connection tube 442, and screw 444 is used to lock the oil collection box module 40.

Figure 6:
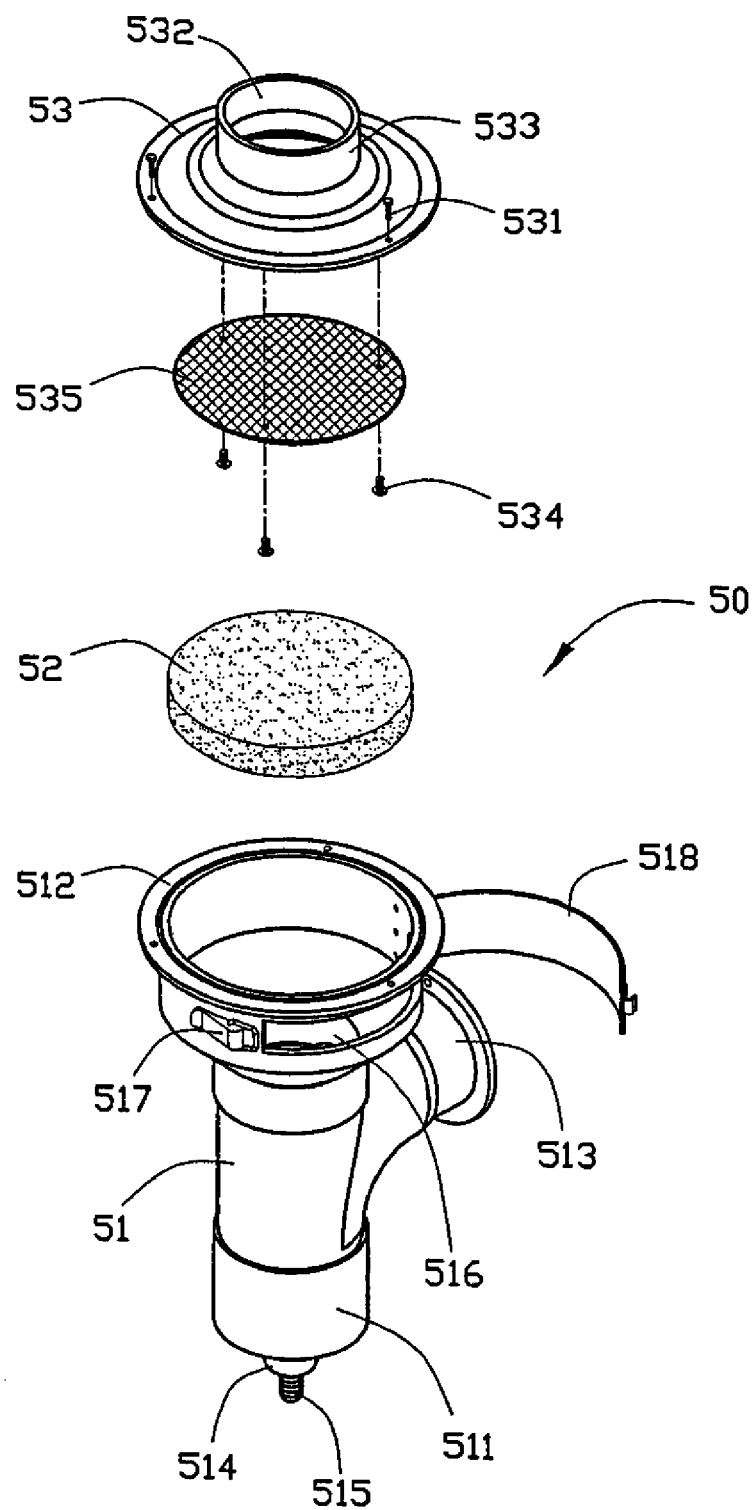
FIG. 6 is a perspective exploded view of the cyclone-separator in accordance with the present invention.

As shown in FIGS. 6 and 2, the cyclone separator 50 comprises a manifold tube 51, filtering material 52 and a top cover 53, and the manifold tube 51 is integrally formed as one unit comprising a bottom tube 511, a top tube 512, and a side tube 513; and the lower section of the bottom tube 511 is provided with a conic section 514 for fastening a streaming connector 515. The wall of the top tube 512 is provided with a lateral opening 516 and a hinge and a hook 517 are used to pivotally mount an arch shape actuating door 518. When the door 518 is closed, the side opening 516 is exactly sealed, and the top tube 512 is for holding the filtering material 52 and the lateral opening 516 is used for placing or withdrawing the filtering material 52.

The top cover 53 is locked at the top section of the manifold tube 51 using screw 531, and the top face of the top cover 53 is protruded out with a connection tube 533 having an air discharging port 532 and the bottom face thereof is mounted with a protection net 535 locked with screw 534. The side tube 513 is used to connect the separator 50 to the air discharging tube 32 and is then locked with screw 54.

Figure 7:
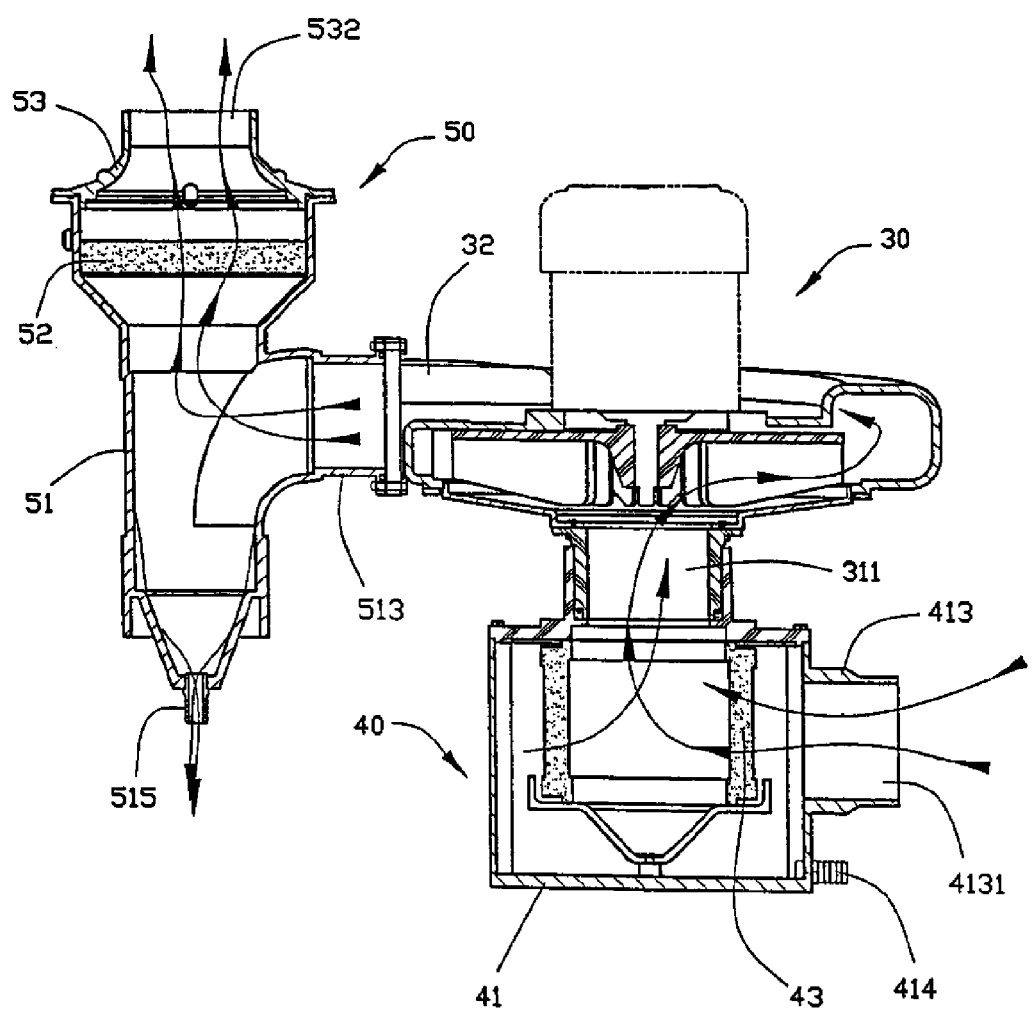
FIG. 7 is a schematic view showing lateral-type sucking and discharging action in accordance with the present invention.

Referring to FIG. 7, in operation, oil-mist is rapidly sucked from the air suction port 4131 of the connection tube 413, and then via the wall of the filter 43 to proceed with first time filtering of oil residue and then through the air discharging tube 32. After that, the oil mist passes from the lateral tube 513 into the manifold tube 51, and through the filtering material 52 for a second oil residue filtering such that clean air is discharged via the air discharging port 532 at the top cover 53. The oil mist as a result of the atmospheric turbulence is condensed at the internal wall of the manifold tube 51, forming into oil residue and flowing downward to the streaming connector 515 for recycling. The collected oil residue at the box body 41 of the oil collection box module 40 is directed from the connector 414 for recycling. Accordingly, a secondary filtering is effected.

Figure 8:
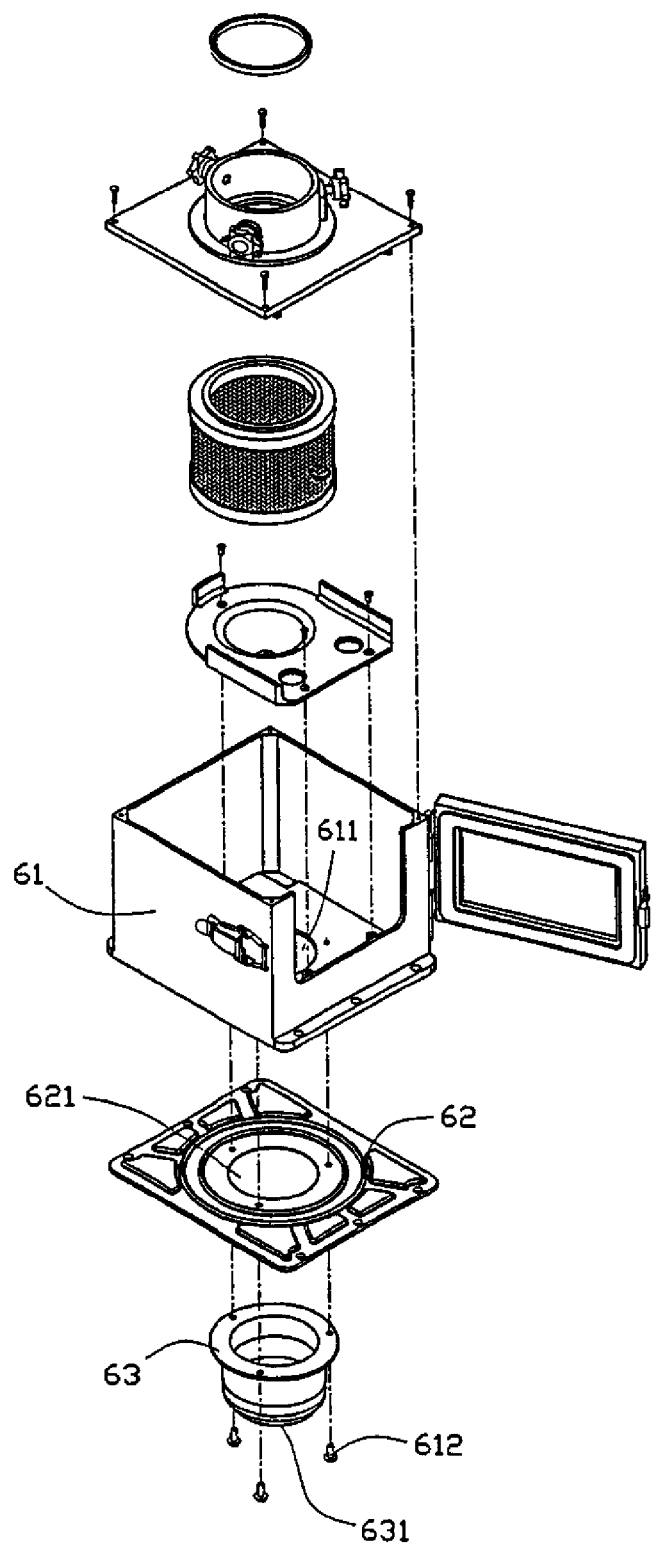
FIG. 8 is an exploded perspective view of an oil-collection box module of another preferred embodiment in accordance with the present invention.
Figure 9:
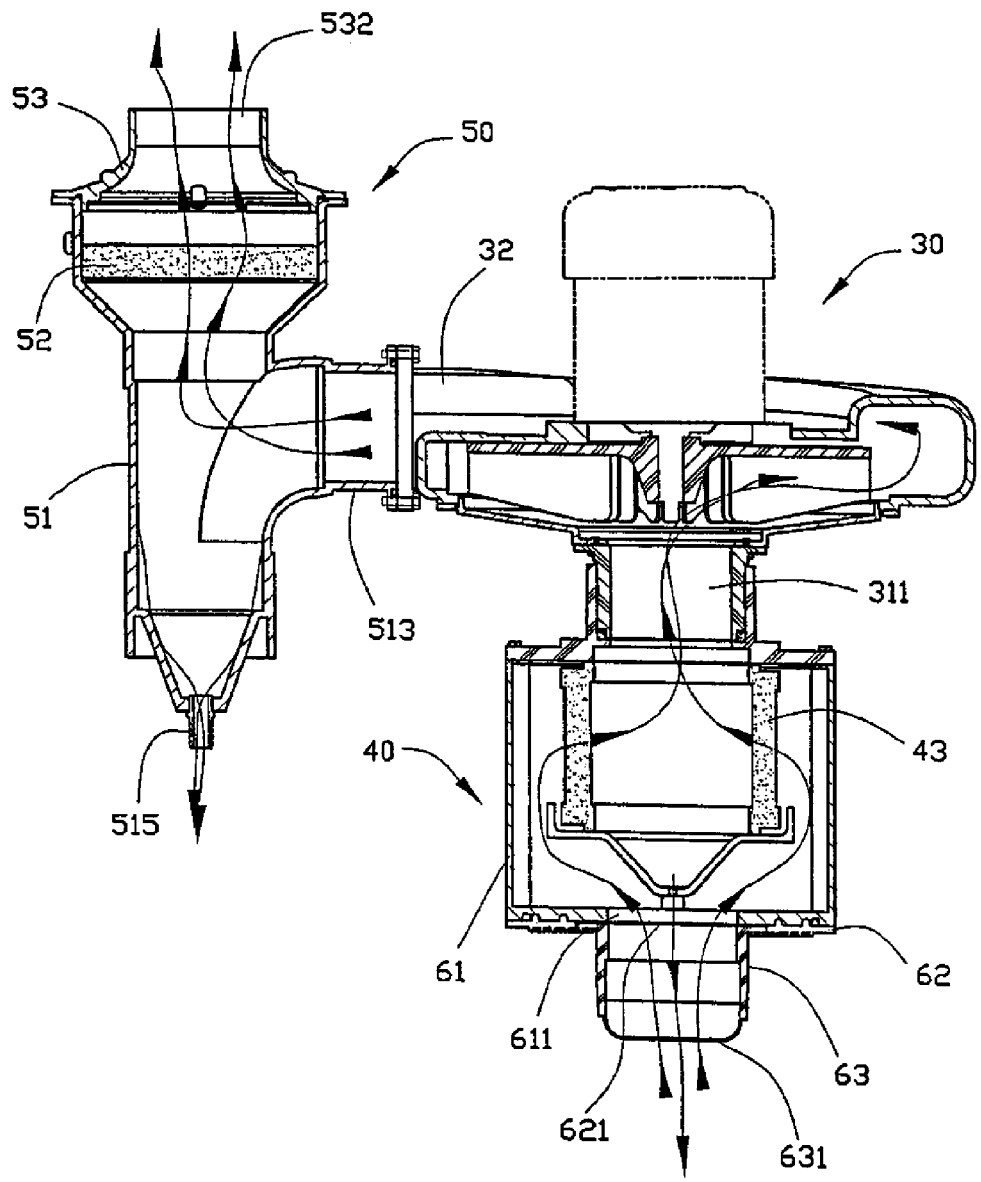
FIG. 9 is a schematic view of a vertical-type sucking and discharging action in accordance with the present invention.

FIGS. 8 and 9 are another preferred embodiments in accordance with the present invention. The bottom face of the box body 61 is provided with a large air suction port 611 and the bottom face is positioned with a shock reducing pad 62 with porous pores 621 and a connection tube 63, and the connection tube 63 is connected in series to the bottom section of the air suction port 611 of the box body 61 by screws 612, and the tube end of the bottom section of the connection tube 63 is mounted with a protection net 631. Thus a vertical type suctioning of oil mist residue is obtained.

In operation, when the blower 30 is switched on, oil mist residue is sucked via the protection net 631 of the connection tube 63. The oil mist residue passes through the porous pores 621 and the suction port 611, and then to the wall of the filter 43 for filtering of oil residue. After, the oil mist residue passes through the suction port 611 via the air discharging tube 32 of the blower 30 and then via the side tube 513 into the manifold tube 51. A second filtering is occurred at the filtering material 52 and the clean air is passing through the air discharging port 532 of the top cover 53 for discharging. The oil mist as a result of the atmospheric turbulence is condensed at the internal wall of the manifold tube 51, forming into oil residue and flowing downward to the streaming connector 515 for recycling. The collected oil residue at the box body 61 of the oil collection box module 40 is directed from the connector 414 for recycling. When the blower 30 is switched off the collected oil residue flows from the suction port 611, the protection net 631 of the connection tube 63 to the machine. Accordingly, a secondary filtering is effected.

Figure 10:
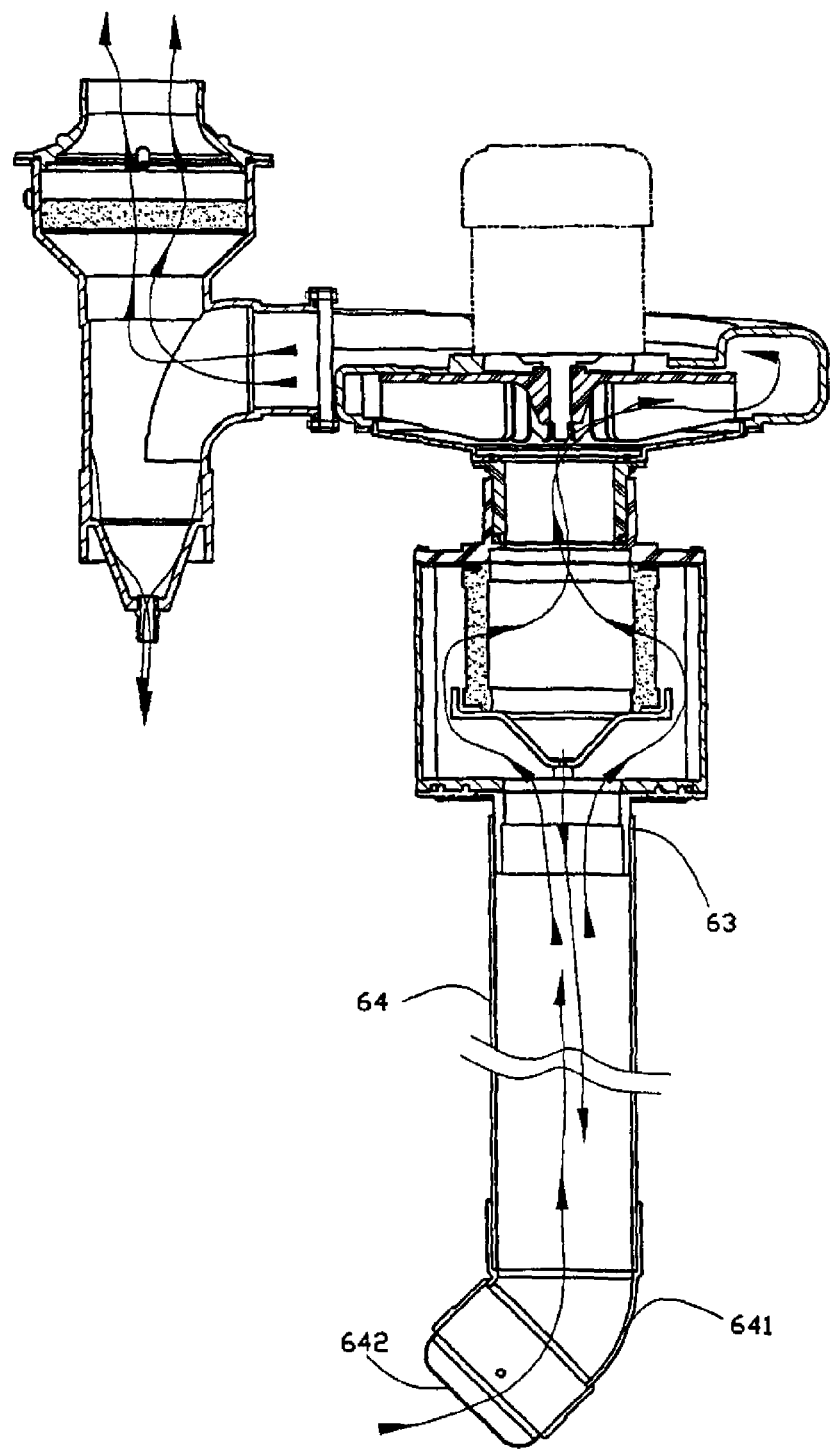
FIG. 10 is a schematic sectional view of another preferred embodiment in accordance with the present invention.

Referring to FIG. 10, there is shown another preferred embodiment, the bottom section of the connection tube 63 employs an extension connection 64 to connect to a bending tube 641 and the end of the bending tube 641 is mounted with another protection net 642. Thus, the extension tube 64 and the bending tube 641 are extended into the interior of a fabrication machine to suck oil mist residue.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An oil-mist filtering blower having tube fitting with air suction port connected in series with an oil collection box module and connected a cyclone separator at a position mounting a discharging tube, characterized in that the oil collection box module comprises a box body, oil collection seat body, filter and covering plate, a connection tube of the covering plate is inserted onto the fittings of the blower and a screw bolt is used for locking; the box body is a hollow shell body having an opening facing the top and the bottom face of the box body is protruded out with a plurality of vertical pillars for locking the oil collection seat body, on the other lateral side of the box body is provided with a large connection tube with an air suction port, a small connector having a streaming hole is locked at a proximal position to the bottom section of the box body, on the other lateral side of the box body, a notch is provided which is used for placing or retrieving the filter, a hinge and a hook pivot is used for mounting an actuating door, the shutting down of the actuating door seals the notch and the inner lateral face of the actuating door is provided with a sealing ring; the downward face of the oil collection seat body is depressed with a conic section having streaming holes, the top face of the oil collection seat body is used to hold the filter such that the filter is exactly positioned at the abdomen region of the box body, the cyclone separator comprises a manifold tube, filtering material and a top cover and the side tube of the manifold tube is connected to the air discharging tube of the blower; and the manifold tube is integrally formed as one unit comprising a bottom tube, top tube, and a side tube; and the lower section of the bottom tube is provided with a conic section for fastening a streaming connector, the wall of the top tube is provided with a lateral opening and a hinge and a hook are used to pivotally mount an actuating door, when the door is closed, the side opening is exactly sealed, and the top tube is for holding the filtering material and the lateral opening is used for placing or withdrawing the filtering material; and the top cover is locked at the top section of the manifold body, and the top face of the top cover is protruded out with a connection tube having an air discharging port and the bottom face thereof is mounted with a filter;

in operation, oil-mist is rapidly sucked from the suction hole of the connection tube, and then via the wall of the filter to proceed with first time filtering of oil residue and then through the air discharging tube, after that from the lateral tube into the manifold tube, and through the filtering material for a second oil residue filtering such that clean air is discharged via the air discharging port at the top cover, and the oil mist as a result of the atmospheric turbulence is condensed at the internal wall of the manifold tube, forming into oil residue and flowing downward to the streaming connector for recycling, and the gathered oil residue at the box body is directed from the connector for recycling, thus, a secondary filtering is effected.

2. The oil-mist filtering blower of claim 1, wherein the bottom face of the box body is provided with a large air suction port and the bottom face is positioned with a shock reducing pad with porous pore and a connection tube, and the connection tube is connected in series to the bottom section of the air suction port of the box body and the tube end of the bottom section of the connection tube is mounted with a protection net.

3. The oil-mist filtering blower of claim 2, wherein the bottom section of the connection tube employs an extension connection to connect to a bending tube having mounted with another protection net at the end of the bending tube, the extension tube and the bending tube extend into the interior of a fabrication machine to suck oil mist.

* * * * *